(12) United States Patent
Bone et al.

(10) Patent No.: US 7,588,397 B2
(45) Date of Patent: Sep. 15, 2009

(54) METHOD AND APPARATUS FOR MACHINING CRANKSHAFTS OR CAMSHAFTS

(75) Inventors: Bramwell W. Bone, Midland, MI (US); Paul Haddad, Midland, MI (US); Ned Arnold, Midland, MI (US)

(73) Assignee: Ingersoll CM Systems LLC, Midland, MI (US)

( * ) Notice: Subject to any disclaimer, the term of this patent is extended or adjusted under 35 U.S.C. 154(b) by 368 days.

(21) Appl. No.: 11/217,107

(22) Filed: Aug. 31, 2005

(65) Prior Publication Data
US 2007/0048098 A1 Mar. 1, 2007

(51) Int. Cl.
*B23B 35/00* (2006.01)

(52) U.S. Cl. .................. 408/1 R; 408/236; 29/888.08; 29/888.1

(58) Field of Classification Search .......... 408/1 R, 408/187, 188, 236; 29/888.08, 888.1; 384/238; 82/86; 83/759, 773; *B23B 35/00*
See application file for complete search history.

(56) References Cited

U.S. PATENT DOCUMENTS

| | | | |
|---|---|---|---|
| 3,083,617 A * | 4/1963 | Swanson et al. | 409/211 |
| 3,806,691 A | 4/1974 | Roach | |
| 3,843,276 A * | 10/1974 | Williams | 408/236 |
| 4,299,017 A | 11/1981 | Gottschalk | |
| 4,561,276 A | 12/1985 | Berstein | |
| 4,624,610 A * | 11/1986 | Phillips et al. | 409/132 |
| 4,629,378 A | 12/1986 | Parsons | |
| 4,637,107 A | 1/1987 | Romeu | |
| 4,655,652 A | 4/1987 | Schissler | |
| 4,757,576 A | 7/1988 | Jaubert | |
| 5,001,917 A | 3/1991 | Berstein | |
| 5,023,983 A | 6/1991 | Winkler et al. | |
| 5,058,261 A | 10/1991 | Kitamura | |
| 5,172,464 A | 12/1992 | Kitamura et al. | |
| 5,235,838 A | 8/1993 | Berstein | |
| 5,333,480 A | 8/1994 | Berstein | |

(Continued)

FOREIGN PATENT DOCUMENTS

DE 3036995 4/1982

(Continued)

OTHER PUBLICATIONS

Holroyd, "Machine Tools, Rotors and Screw Pumps", retrieved from the internet: http://www.renold.com, Mar. 2000, 3 pages.

*Primary Examiner*—David P Bryant
*Assistant Examiner*—Eric A Gates
(74) *Attorney, Agent, or Firm*—Fitch, Even, Tabin & Flannery

(57) ABSTRACT

An apparatus and method are provided for performing multiple machining operations on a workpiece such as a crankshaft. Oil holes may be drilled in a crankshaft by a tool shifted along a curved path between successive, acute angle tool plunging locations. The tool's carrier is shifted parallel to the crankshaft axis and the tool carrier is rotated to the desired acute angle about a point on the crankshaft axis for each of successive oil hole drilling locations thereby reducing programming needed to drill the oil holes at the specified angles. Offset tolerance errors are reduced by a large factor as the tool is plunged from an outer initial position toward the crankshaft axis.

7 Claims, 13 Drawing Sheets

U.S. PATENT DOCUMENTS

| | | |
|---|---|---|
| 5,391,850 A | 2/1995 | Mueller |
| 5,445,003 A | 8/1995 | Gottschalk et al. |
| 5,495,738 A | 3/1996 | Gottschalk |
| 5,575,167 A | 11/1996 | Gottschalk et al. |
| 5,759,140 A | 6/1998 | Egbert |
| 6,203,478 B1 * | 3/2001 | Gorrochategui .............. 483/31 |
| 6,228,007 B1 | 5/2001 | Quak et al. |
| 6,322,300 B1 * | 11/2001 | Santorius et al. ........... 409/199 |
| RE37,794 E | 7/2002 | Egbert |
| 6,485,401 B2 * | 11/2002 | Gorrochategui ................ 483/1 |
| 6,786,073 B2 | 9/2004 | Bone |
| 6,836,941 B2 * | 1/2005 | Prust et al. .................. 29/27 C |
| 7,384,221 B2 * | 6/2008 | Feinauer et al. ............... 408/56 |
| 2001/0008862 A1 * | 7/2001 | Gorrochategui ................ 483/1 |
| 2005/0084354 A1 * | 4/2005 | Feinauer et al. ............ 408/236 |
| 2008/0101880 A1 * | 5/2008 | Bone ......................... 409/131 |

FOREIGN PATENT DOCUMENTS

| | | |
|---|---|---|
| JP | 59-232707 | 12/1984 |
| WO | WO 03070407 A1 * | 8/2003 |

\* cited by examiner

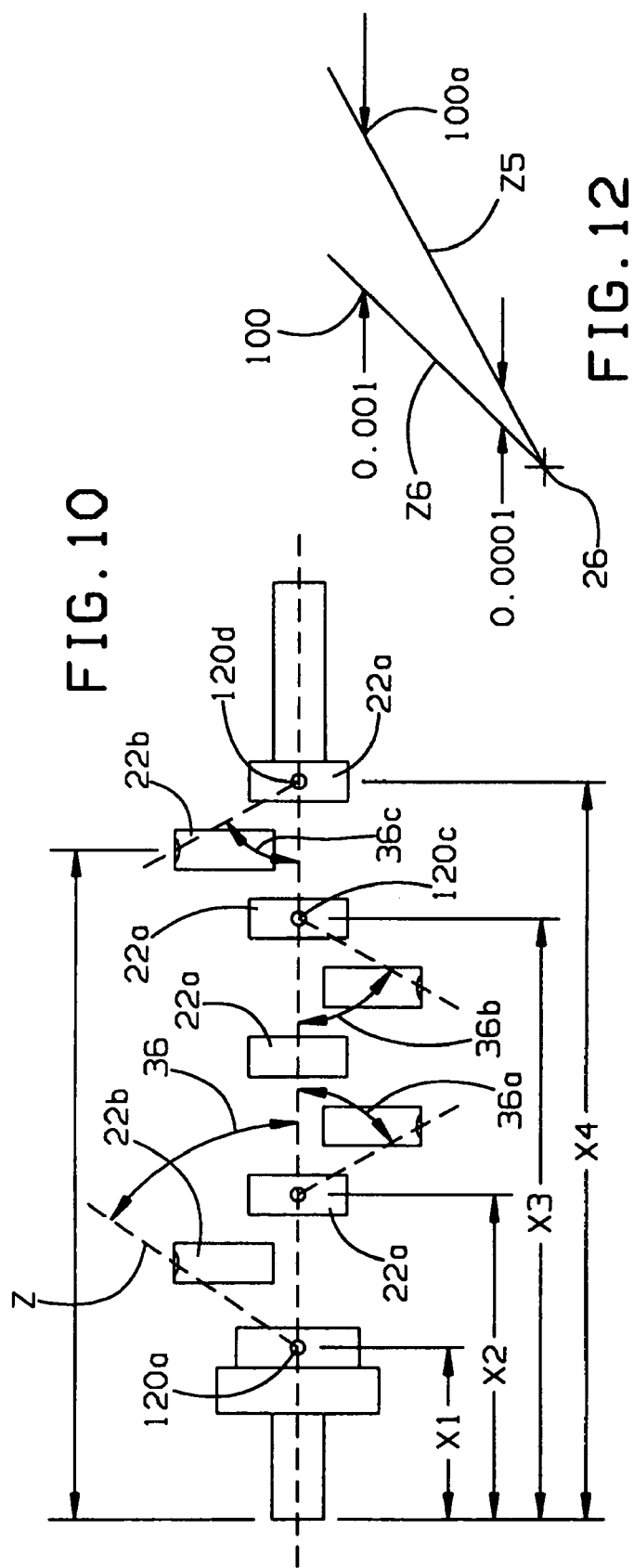
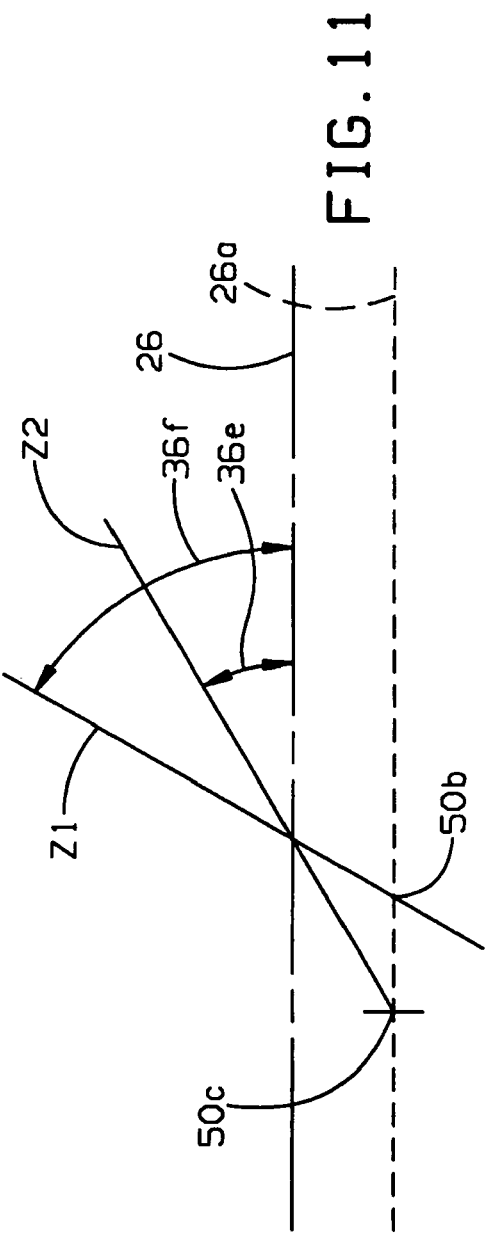
FIG. 10
FIG. 11
FIG. 12

METHOD AND APPARATUS FOR MACHINING CRANKSHAFTS OR CAMSHAFTS

FIELD OF THE INVENTION

This invention relates to a method and apparatus for machining crankshafts or camshafts and, more particularly, for machining crankshafts or camshafts on a production scale basis.

BACKGROUND OF THE INVENTION

As disclosed in U.S. Pat. No. 5,759,140 assigned to the Assignee of this application, crankshafts may be machined to have oil holes at various angles to the longitudinal axis of the crankshaft and at various rotational positions about the circumference of the crankshaft and spaced lengthwise portions along the length of the crankshaft. The cutting tool is moved along and across the length of the crankshaft to cut a hole anywhere along and across the axial length of the crankshaft. As disclosed in the foregoing patent, the cutting tool travels along a fixed axis and the crankshaft is mounted in a workholder or fixture which turns about a turning axis normal to the longitudinal axis of the crankshaft in order to drill at various angles to this longitudinal axis. Also, the crankshaft is spun about its longitudinal axis to present various peripheral, rotational locations for drilling. The crankshaft is held in a fixture or workholder usually having a pair of crankshafts mounted between headstocks and tailstocks for spinning of the crankshaft and having an open face for permitting the loading and unloading of the crankshaft through the open face. The machine disclosed in the foregoing patent also has an automatic tool changer such as a wine rack to allow it to use different cutting tools and/or bushings or the like for each of the particular hole configurations and multiple tools are disposed side-by-side for traveling along parallel plunging axis to machine a pair of crankshafts at the same time to increase the production of the machine.

The present invention is also related to moving milling machine into engagement with crankshafts or the like to provide milling cutters which cut at an acute angle to the axis but desire to leave a flat, horizontal face on the cam profile such as patents to Phillips U.S. Pat. Nos. 4,551,048 and 4,624, 610 and as disclosed in co-pending provisional application, U.S. Provisional Patent Application No. 60/680,934, filed May 13, 2005.

Often crankshafts or camshafts for automobile engines and truck engines or the like are manufactured or machined in large production quantities on multi-station transfer lines. Each station of which is dedicated to machining one or more holes, such as holes in crankshafts or to machining a cam profile on a camshaft. The transfer line works well where the workpiece for a given production model will have identically machined holes or cam profiles for thousands and thousands of workpieces which are machined. Thus, there is a need for a new and improved method and apparatus for drilling the complete crankshaft in one station rather than drilling one hold in each station as in a transfer line.

The drilling of oil holes in crankshafts at precise locations involves drilling into eccentric pin bearings and through main bearings at precisely located positions for the entry point of the hole and the exit point for the hole at various acute angles to the longitudinal axis of the crankshaft. In the aforementioned patented machine, and in other following patented machines, the drilling tool traveled along one of the orthogonal X or Y axis and the entire crankshaft was turned to the desired inclined angle to the tool travel axis in order that the drilled hole be located at the desired acute angle to the crankshafts longitudinal axis. Various tolerances are encountered in precisely positioning the tool entry point, when rotating the crankshaft, shifting the tool carrier and tool between successive oil hole drilling locations, positioning the tool and crankshaft relative to one another at the desired angle, and shifting the tool along its plunging axis at this angle. Hence, it is necessary for a successful, commercial machine to overcome these positioning tolerances in order to accurately locate these holes in the crankshaft at the desired angle, peripheral location and longitudinal offsets.

Moreover, in these commercial machines, the tool is positioned with computer controlled drives using a computer and/or controller and software therefore. Hence, it is desirable for a commercial, production machine to simplify the software needed to locate and position the tool for drilling oil holes at precise included angles, at the predetermined entry and exit points along the crankshaft and at the desired tool entry points on the crankshaft's peripheral surface.

SUMMARY OF THE INVENTION

In accordance with the illustrated embodiment, a new and improved apparatus and method are provided in which a workpiece is rotated about its longitudinal axis and in which a machining head or tool carrier is pivoted or turned to position a cutting tool to plunge along a plunging axis Z which is at an oblique angle to the longitudinal axis of the workpiece to thereby machine the workpiece at an angle to the longitudinal axis of the crankshaft.

In machining crankshafts in this preferred manner, the tool is shifted parallel to the longitudinal axis of crankshaft from drilling a hole at a first location to the next drilling hole location and the tool is rotated to the desired angle, usually an acute angle, and then the tool is plunged into the work piece along this plunging axis which is at the desired angle for the oil hole.

In the preferred method and apparatus, the offset distance between successive holes is measured along the crankshaft center line and the tool is shifted through the respective offset distances which are spaced at offset distances at which the drilled holes intersect the centerline so that the programming may be simplified. That is, rather than programming X and Y offsets for shifting the tool along an inclined plunging axis from the tool entry point and across the longitudinal axis to the exit point, the offset distances are located at successive tool centerline intersection points along the interior centerline of the crankshafts. Thus, the tool need be shifted only once along an X axis which is parallel to the crankshaft longitudinal axis for hole drilling operation and then the tool plunged at the desired acute angle for that hole to and through the centerline of the crankshaft.

In accordance with an important aspect, the accurate travel path for tool carrier and/or tool is centered about the crankshaft axis to reduce errors in the movement and to precisely locate the machine tool relative to the workpiece.

In the illustrated embodiment, the tool carrier is mounted for arcuate travel and is driven along an arcuate travel path by a curved rack and pinion drive. The axis of curvature of the rack is preferably aligned with the crankshaft longitudinal axis to reduce error in rack and pinion drive play or tolerance. As the cutting tool moves along a plunging axis toward the workpiece, the offset play or tolerance error in the rack and pinion drive is reduced by a factor depending upon the distance that the tool is from the center line which error diminishes by a large factor as the tool approaches and engages the workpiece for the machining thereof.

In the preferred embodiment, the axis of the crankshaft is horizontal and it can be freely loaded from above and the angle of the oil hole relative to the longitudinal axis of the crankshaft can be easily adjusted by rotating the tool carrier to the desired angle and then plunging the tool on this angle to drill the hole.

BRIEF DESCRIPTION OF THE DRAWINGS

FIG. 10 is a diagrammatical illustration of machine hole locations on a crankshaft and the X-axis displacements to move between the respective hole locations for the drilling of oil holes;

FIG. 11 is a diagrammatical illustration of shifting the pivot axis of the tool carrier to a location below the crankshaft longitudinal axis; and FIG. 12 is an illustration of how an error of X-axis positioning is reduced as one moves toward the intersection of the inclined cutting B-angle path and the longitudinal axis of the crankshaft.

DETAILED DESCRIPTION OF THE PREFERRED EMBODIMENT

Figure 1:
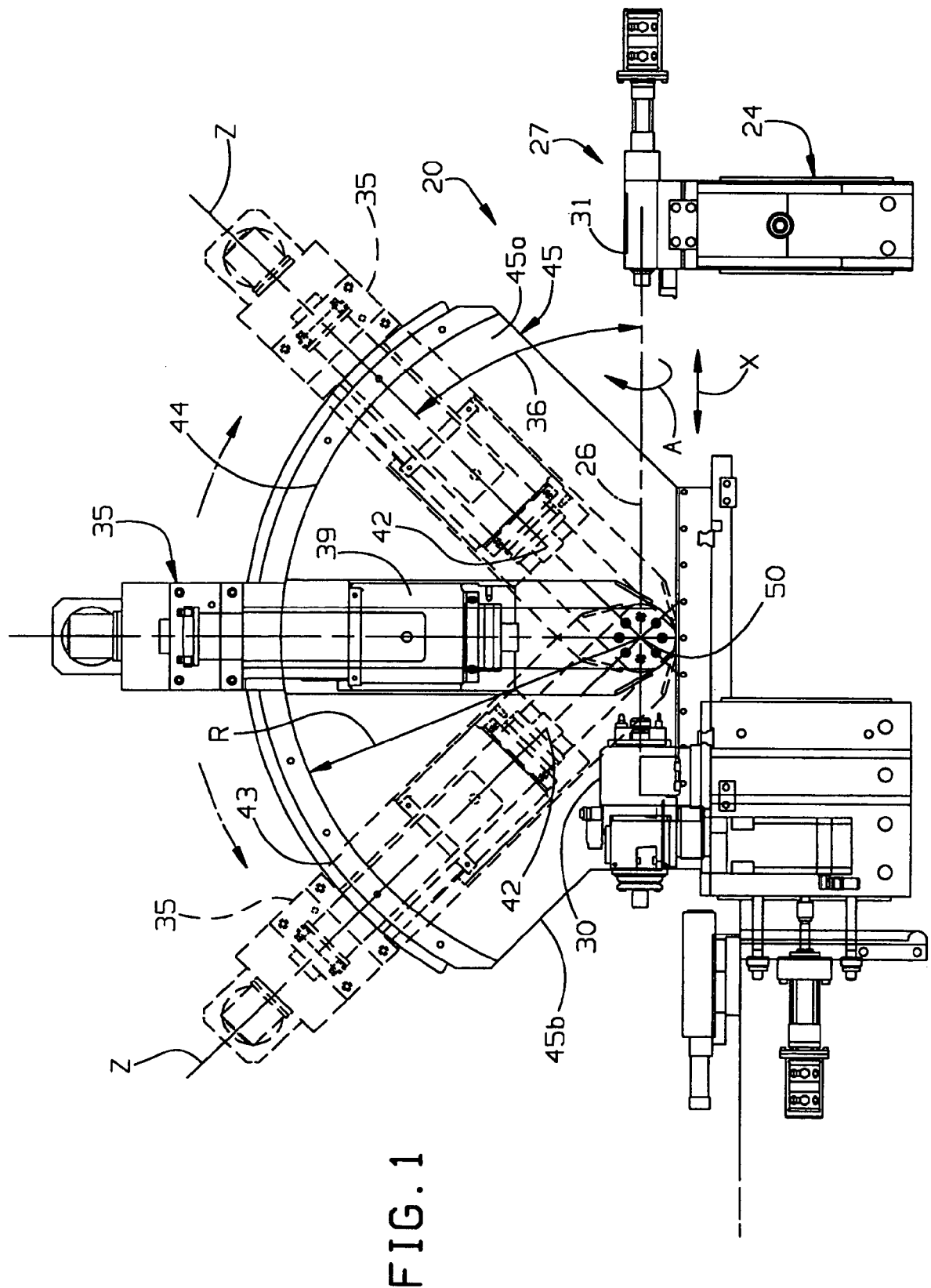
FIG. 1 is a front partial view of the apparatus constructed in accordance with the preferred embodiment of the invention.

As shown in the drawings for purpose of illustration, there is shown a multi-axis machining apparatus 20 for machining a workpiece 21 which in this instance is illustrated as a crankshaft 22, although the workpiece could be a camshaft such as milled in the aforesaid Phillips patent number and as disclosed in the co-pending provisional application, U.S. Provisional Patent Application No. 60/680,934, Filed May 13, 2005.

Figure 2:
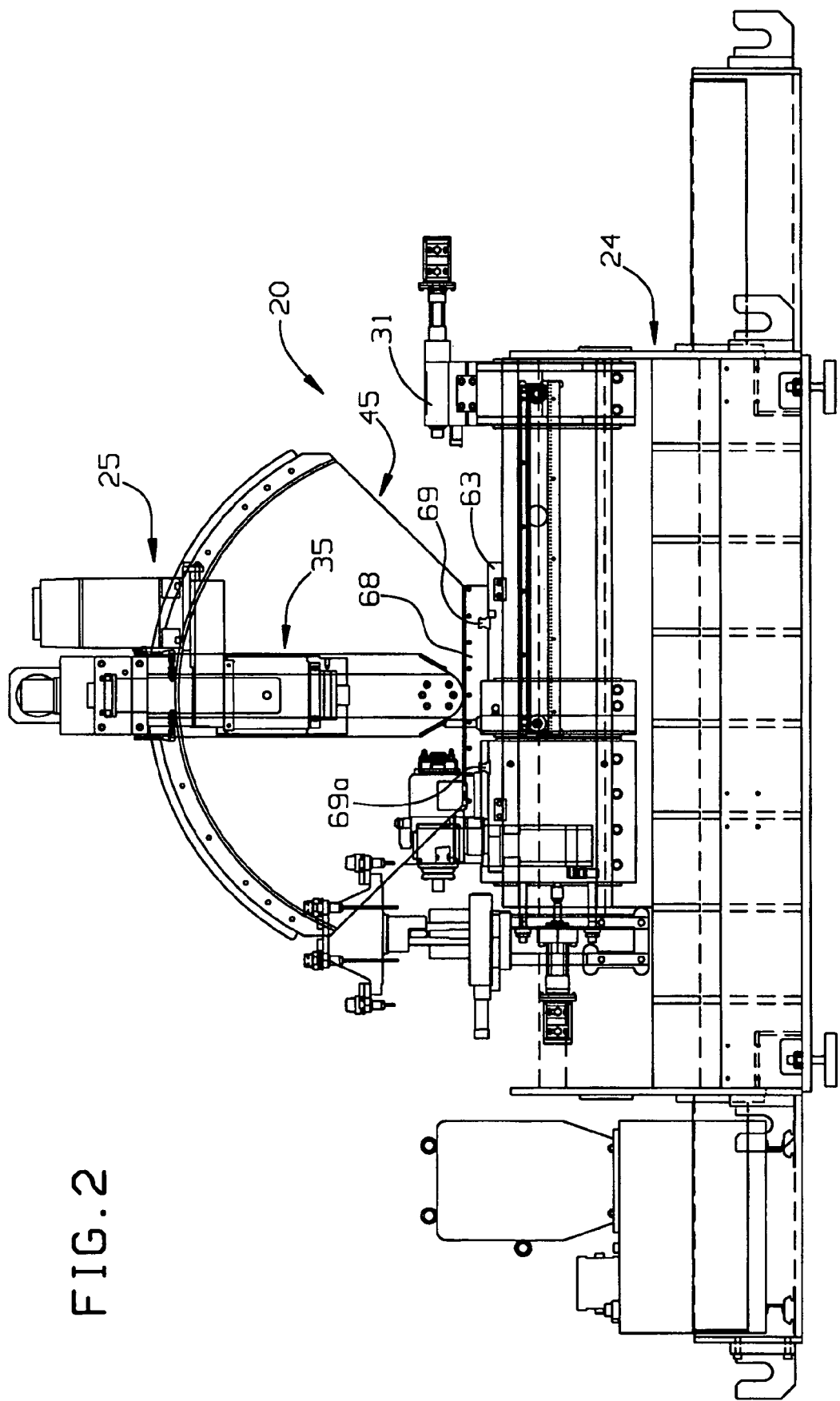
FIG. 2 is a front elevational view showing the lower portion of the apparatus for drilling oil holes and the like in accordance with the invention.
Figure 3:
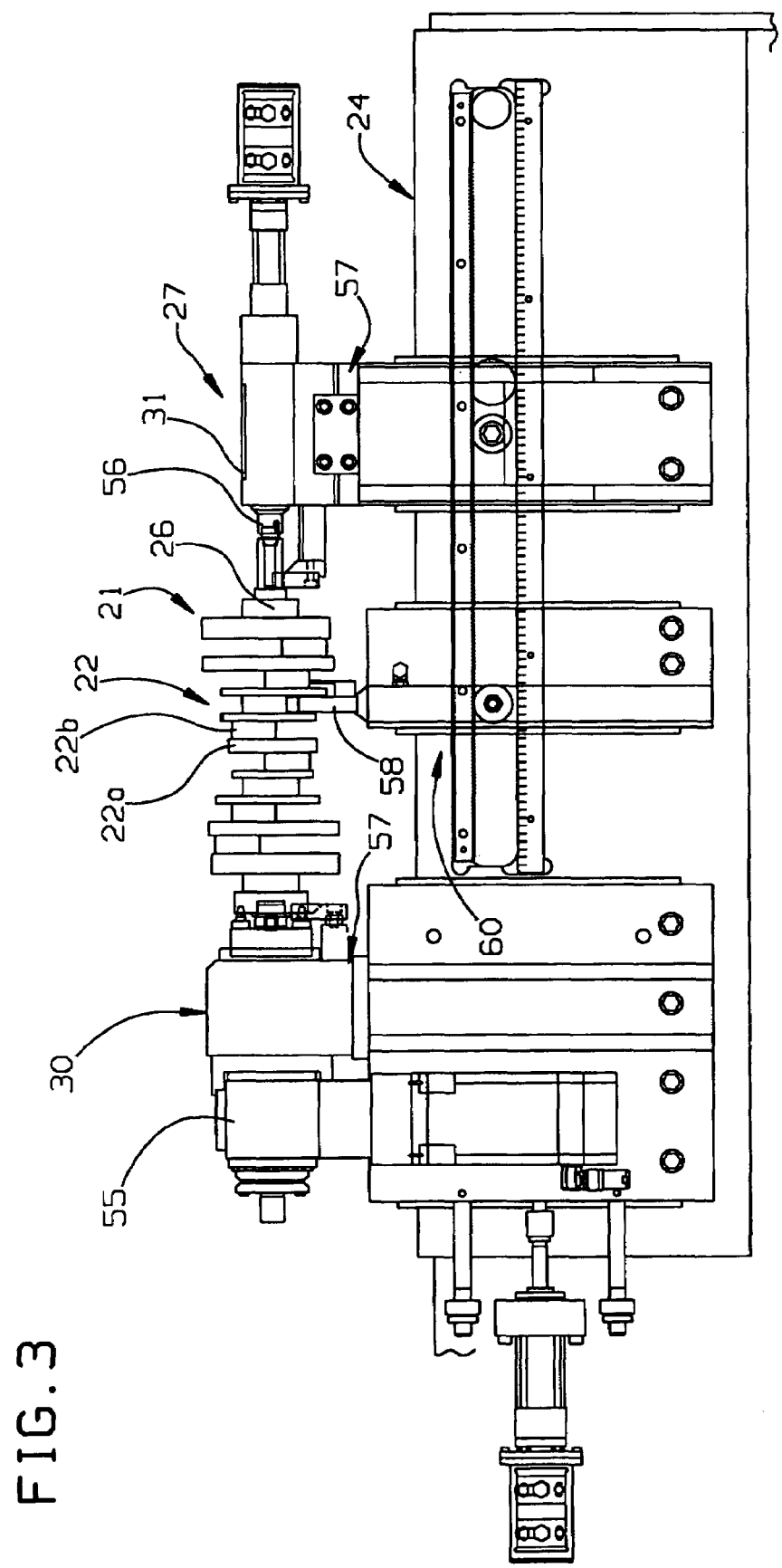
FIG. 3 is a view of the headstock and tailstock supporting a pair of crankshafts for having oil holes drilled therein.

As best seen in FIGS. 1-3, the apparatus 20 includes a base or lower stationary frame 24 on which is mounted a vertical stack or column 25 which is moveable in orthogonal X and Y-directions with the X-direction being parallel to a longitudinal axis 26 of the workpiece when it is mounted on a support or fixture 27 for machining.

As best seen in FIG. 3, the crankshaft is rotated and is positioned in the fixture 27 which holds a pair of crankshafts, and comprises a headstock 30 and a tailstock 31 which in this instance defines a horizontal axis for rotation which coincides coaxially with the longitudinal axis 26 for the workpiece. The workpieces may be rotated to present different peripheral surfaces for machining, such as by rotating a chuck, which is located within a headstock 30 and which grips an end of the workpiece to rotate the workpiece about its axis as shown by the directional arrow A in FIG. 1.

In accordance with the illustrated embodiment, a tool carrier 35 is pivoted or turned along a curved B-axis from the vertical solid line position to various angular or inclined positions, such as shown in dotted lines in FIG. 1, to have an angle such as the angle 36 between a tool plunging axis Z and the rotational longitudinal axis 26 of the workpiece. A pair of tools 40 (FIG. 4) are mounted on the tool carrier and each is moveable along a plunging axis Z, which is the plunging axis of the tool. Preferably, the pivoting or swinging of the tool carrier 35 is accomplished by means of a arcuate rack 46 mounted on a vertical stack frame member or plate 45 and a motor drive 47 mounted on the tool carrier 35. The motor drive has a pinion gear 48 meshed with the arcuate rack 46. Thus, the cutting tool is pivoted relative to the workpiece to provide the proper angle at which to machine the crankshaft oil hole, as illustrated by the dotted line positions shown in FIG. 1. Rather than moving the tool carrier 35 along a pair of orthogonal X and Y axes such as provided in the prior art machines to plunge its tool, the cutting tool carrier 35 in the apparatus of FIG. 1 is pivoted to travel along a curved slide surface 43 on the vertical stack plate 45 to the desired angle for the oil hole; and the tool is moved along the Z-plunging axis to machine the workpiece such as by drilling an oil hole into the crankshaft with the oil hole having angular disposition of that of the plunging axis Z relative to the longitudinal axis 26 of the workpiece.

In accordance with an important aspect of the embodiment, the curvature of the slide surface 43 and the curvature of the arcuate rack 46 is as seen in FIG. 1 are located at radii that have a center or pivot axis 50 coincident the longitudinal axis 26 of the workpiece. The radius for the rack as indicated by the line radius R in FIG. 1.

Figure 9:
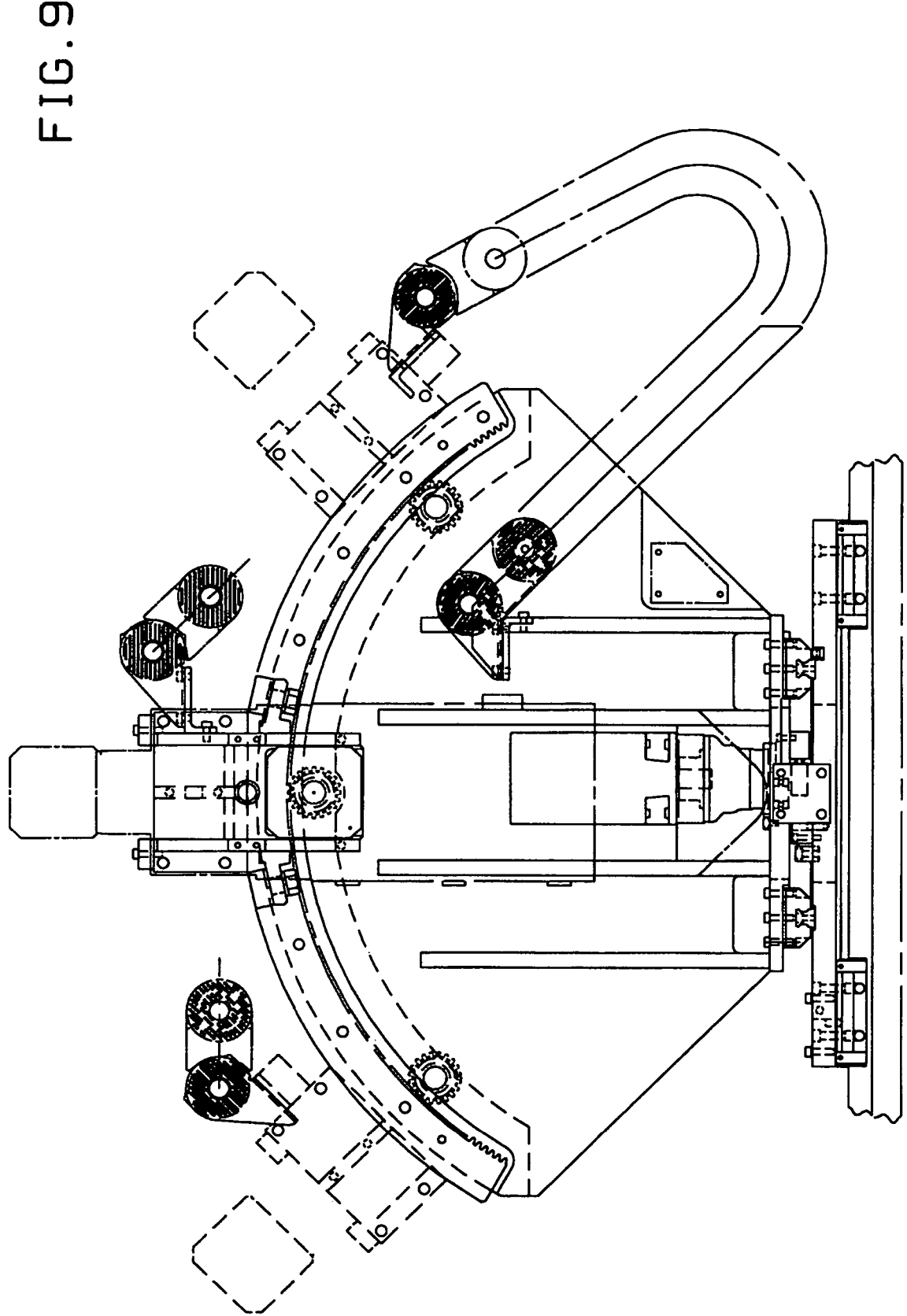
FIG. 9 is a rear elevational view of the machine shown in FIG. 9.

In accordance with another important aspect, a simple programming of the X-axis which is parallel to the rotational axis 26, as will be explained hereinafter in conjunction with FIGS. 10-12, allows the repositioning of the vertical stack 25 tool along the length of the workpiece to drill the crankshaft at different offsets X1, X2, X3 and X4 as shown in the diagram of FIG. 9 and then a plunging along the plunging axis Z without having to make simultaneous X and Y-axis displacements.

In accordance with another aspect, the pivoting of the tool carrier 35 and tool about the longitudinal crankshaft axis 26 reduces errors in the drill entry point and exit point accuracy by a factor determined by the radial distance of the rack 46 and pinion 48 to the longitudinal axis of the workpiece. As will be explained hereinafter in conjunction with FIGS. 10-12, the preferred radial distance is such that the error factor is reduced by a factor of 10 to 12, in most instances. For example, if a rack and pinion error, such as from backlash, etc. is 0.001 inch too large in travel between points X1 and X2, as illustrated in FIGS. 10 and 12. That is, the cutting tool carrier 35 will begin to travel down toward and engage the crankshaft along plunging axis Z2 at an upper point 100a which is 0.001 too far to right from the theoretical point 100 on a theoretical plunging axis Z1. However, when the tool travels down along this 0.001 offset plunging axis Z2 toward the crankshaft axis 26, this offset horizontal distance between points 100 and 100a will be reduced by one tenth to 0.0001 inch at points 100b and 100c at the centerline 26 of the crankshaft. This is an advantage for this illustrated embodiment over the conventional orthogonal axis machines.

Referring now in greater detail to the illustrated embodiment, the crankshaft 22 as shown in FIG. 3 as being mounted in the workpiece support which includes the headstock 30 and the tailstock 31. The headstock has a chucking device to grip the end of the crankshaft and to rotate the crankshaft about its longitudinal axis 26. A motor drive 55 for the headstock turns the crankshaft to present the correct point on the periphery of the crankshaft for the drill tool entry point. A quill 56 on the tailstock supports and centers the right end of the crankshaft to rotate about the rotational axis 26. Each of the headstock 30 and tailstock 31 are mounted for rectilinear sliding movement along the machine base by suitable guides or ways 57 both toward and away from the ends of the crankshaft so as to allow a machined crankshaft to be removed and a new crankshaft to be lowered into position between the headstock 30 and the tailstock 31 which are then slid towards one another to grip and center the crankshaft therebetween for rotational movement. Additionally, it is preferred to provide a steady rest 58 (FIG. 4) which is positioned to steady the crankshaft in a well-known manner. Herein the steady rest 58 is mounted on a rack and pinion slide 60 so as to be moveable in a direction parallel to the rotational axis 26 in order to be properly positioned relative to the main bearing 22a or pin bearing 22b on the various crankshafts that are machined with the illustrated apparatus.

Figure 4:
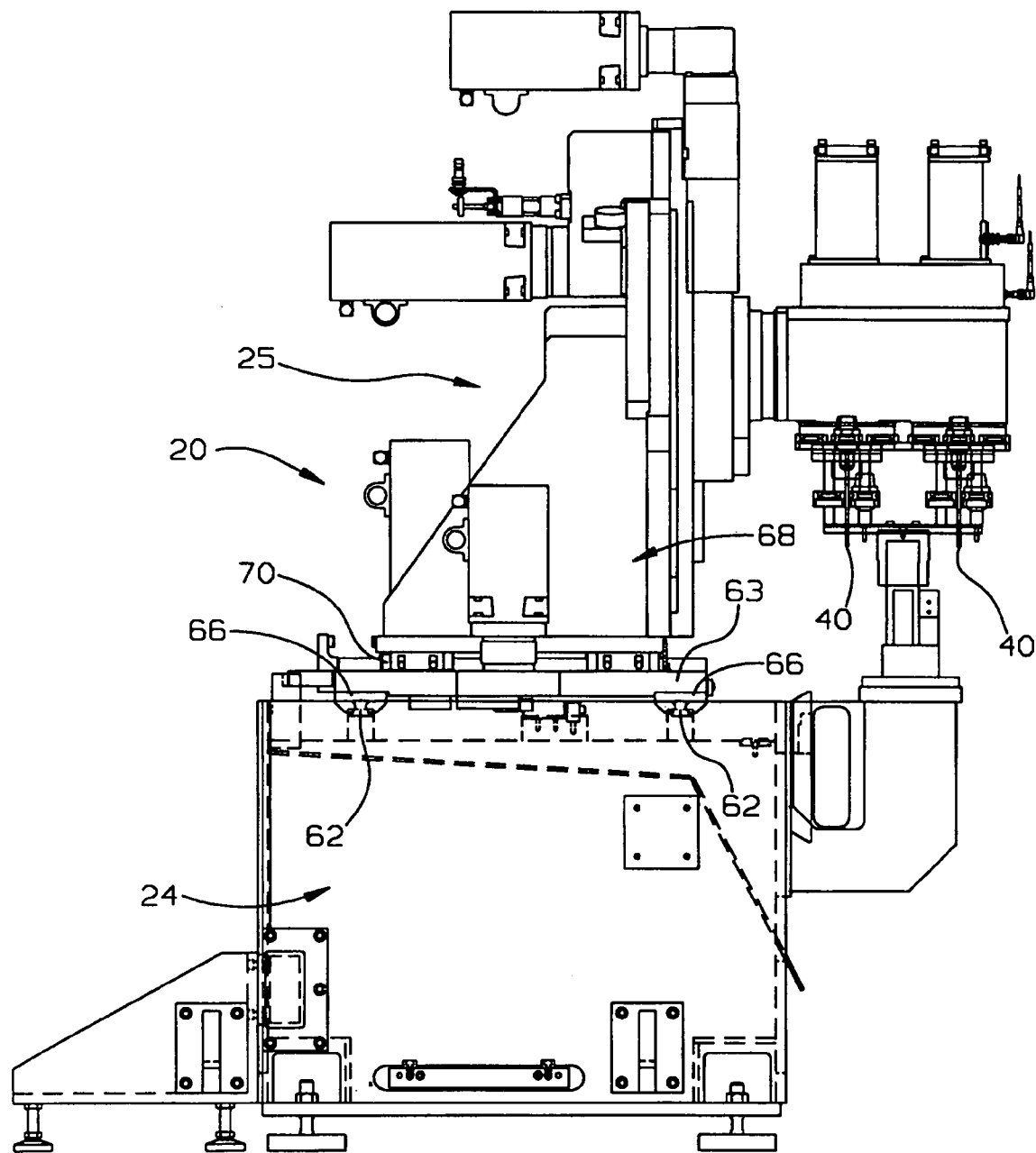
FIG. 4 is a side elevational view of the preferred apparatus for drilling a pair of crankshafts simultaneously.

Referring now to FIG. 4, there is illustrated the base frame portion 24 of the apparatus on which is mounted the vertical stack or column 25 and which is moveable in an orthogonal X and Y-axis directions to position the tool carrier 35 and the cutting tools 40 thereon in proper position to machine the pin bearings 22b (FIG. 3) and main bearings 22a of the crankshafts 22. As best seen in FIG. 4, the lower stationary base 24 is generally block-shaped and has a plurality of horizontally extending lower ways or slides 62 that are stationary and parallel to one another and extend in the X-direction. An X-slide 63 or platen 63 extends horizontal and is located at the bottom of the stack or column 25 for movement in an X-direction parallel to the longitudinally extending ways which are parallel to the longitudinal axis 26 of the workpiece. The platen 63 carries spaced guide or slide blocks 66 on its underside which slide along the stationary ways 62a as the stack is being shifted in the X-direction from drilling a first set of oil holes to a second set of oil holes displaced in the X-direction along the crankshaft axis. The ways and slide blocks have a generally dovetail relationship to one another. Thus, the X-axis platen 63 supports the remainder of the stack 25 located thereabove and carries the latter in the X-direction as it is driven in this direction by an X-motor drive 64 for the stack.

Figure 5:
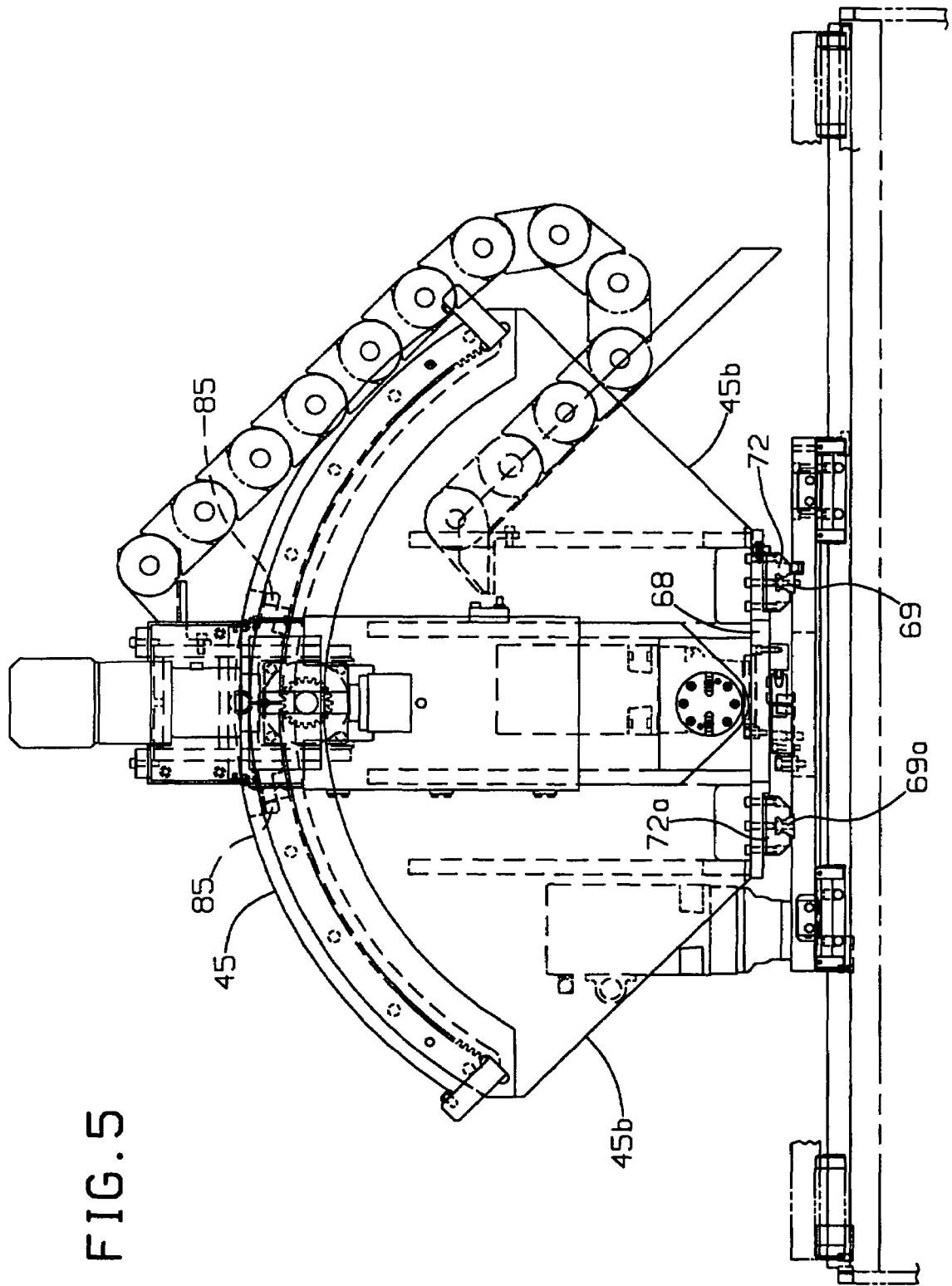
FIG. 5 is an enlarged, front elevational view showing the preferred embodiment of the apparatus having X and Y-axis slides for supporting a vertical stack.
Figure 7:
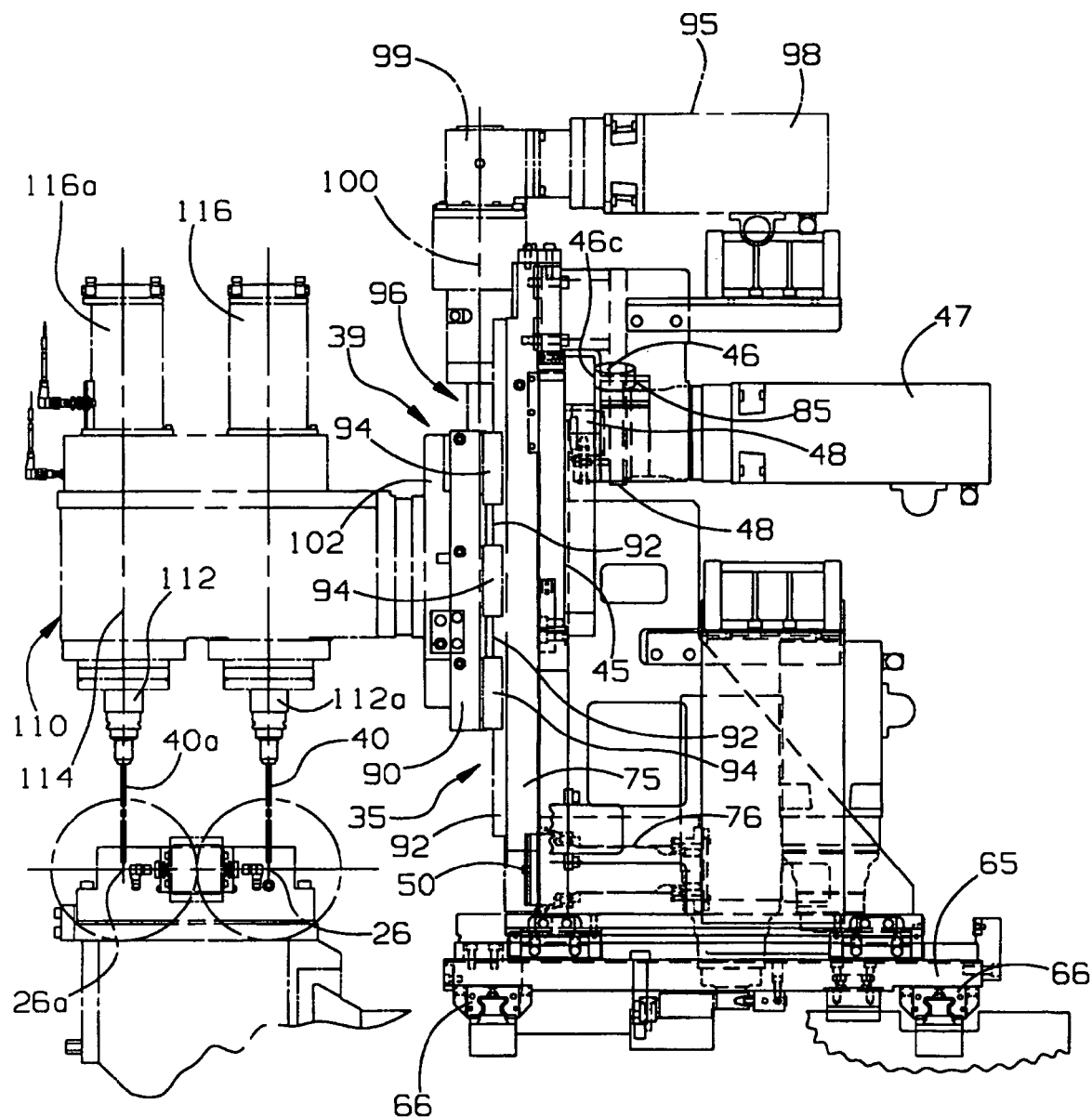
FIG. 7 is a side elevational view of a tool carrier used with the apparatus shown in FIGS. 1 and 2.

The stack column 25 has a bottom plate or Y-platen 70 which is guided for movement in the Y-direction, is mounted above and on the X-platen 63 for sliding along its Y-axis ways 69 and 69a, as best seen in FIGS. 2 and 5 carried by the platen 63. As shown in FIG. 5, this platen 70 of the vertical stack frame, which serves as a Y-axis slide 70, has depending guide blocks 72 and 72a fastened to its bottom side. These guide blocks 72 and 72a slide along the ways 69 and 69a on the X-body platen 63 for carrying the upper portion of the column 25 and tool carrier 35 along a Y-axis direction toward or from the workpieces so as to position the tools and spindles, as shown in FIG. 7, for machining the pair of crankshafts. The upper portion vertical column includes the vertical frame plate 45 that has a top curved edge 45a ending in a pair of downwardly and inwardly inclined edges 45b which define a generally sector shape for the column 25.

Figure 8:
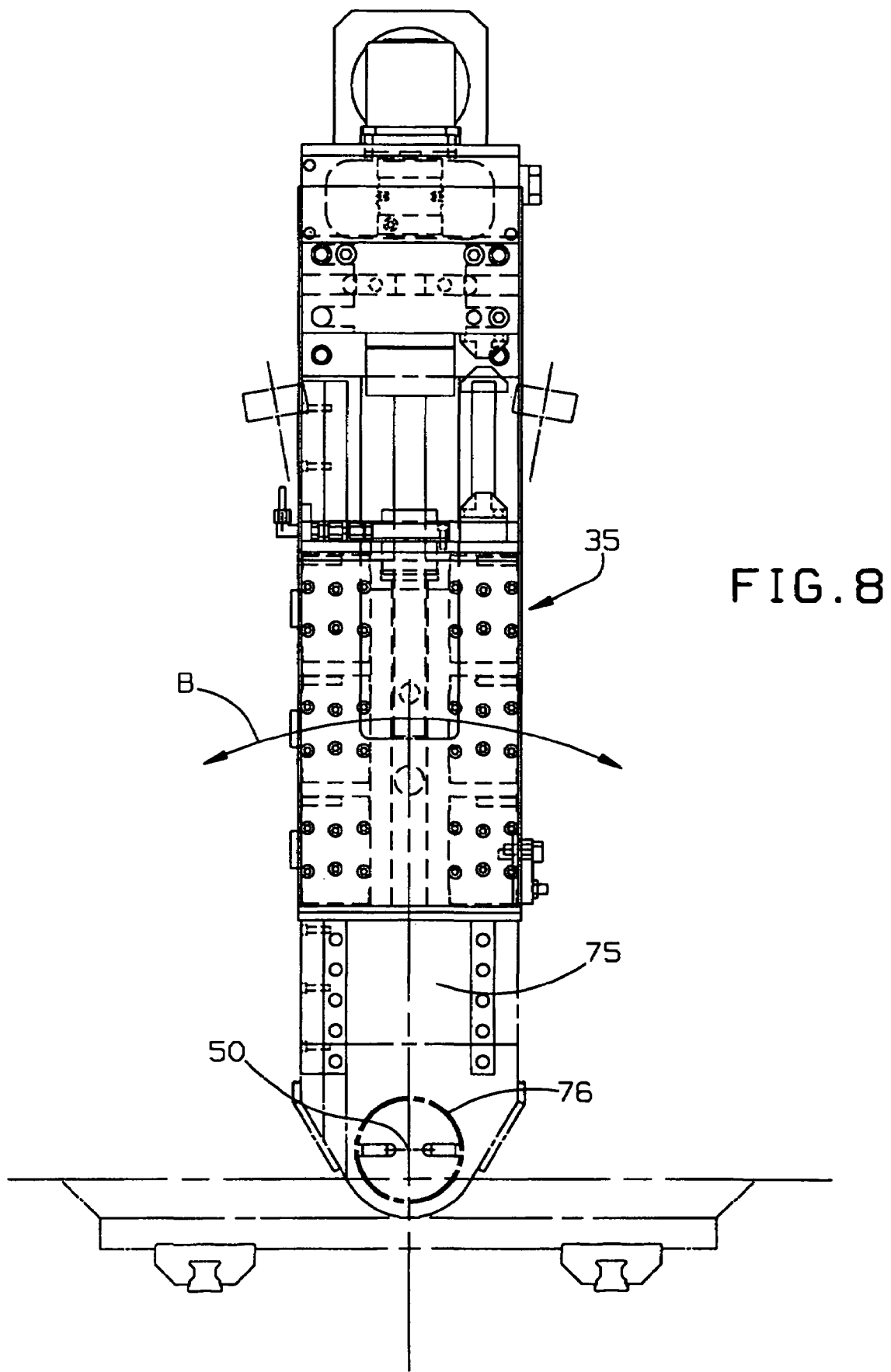
FIG. 8 is a front elevational view of the tool carrier.

As been seen in FIGS. 1 and 7, the tool carrier 35 is pivotally mounted to swing about a horizontal pivot axis 50 which is preferably aligned with the longitudinal rotational axis 26 for reasons to be described more fully hereinafter. That is, the vertical height of the pivot axis 50 in the machine about which the tool carrier 35 swings between the central solid-line position shown in FIG. 1 to either the left phantom line position or the right-hand phantom line position is at the same vertical height in the machine as the rotational axis 26 of the crankshaft. As best seen in FIG. 8, the tool carrier 35 is relatively narrow and has a main frame member 75 which is a robust support member in that it carries the plunging Z-axis motor drives, the cutting tool slides 39 and its spindles and tools and that must withstand the forces engendered when drilling the oil holes as well as providing for very accurate positioning of the tools 40 and 40a. In the solid line position as shown in FIGS. 1 and 8, the tool slide is orthogonal or at 90° to the cutting axis 26, but usually the oil holes are to be drilled at an angle such as illustrated by the angles 36 in FIG. 1 and FIG. 11 each of which is an acute or obtuse angle, rather than a right angle of 90°.

Figure 6:
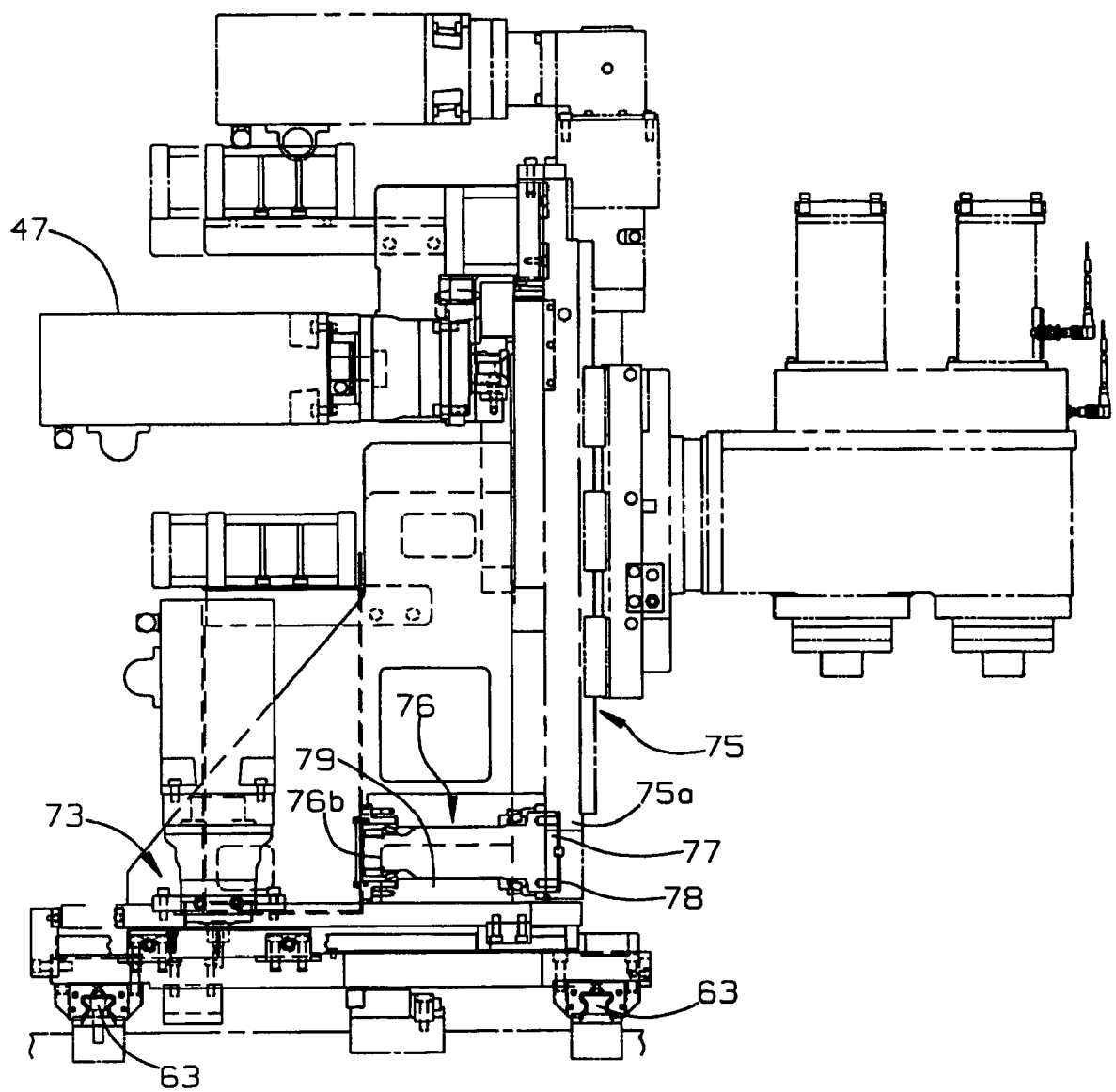
FIG. 6 is a side elevational view of the apparatus.

For the purpose of pivotally mounting the tool carrier 35 to swing between the various angular positions about the pivot axis 50, the lower end of the frame member 75 of the tool carrier 35 is mounted to rotate in a large bearing 76 (FIG. 6) which is mounted in the base portion of the Y-axis stack frame 68 of Column 25. The preferred and illustrated bearing 76 is a very large spindle such as a Timken spindle which includes as best seen in FIG. 6, a head portion 77 secured by fasteners 78 to the lower plate 75 of the Y-axis stack frame 68. This bearing 76 is mounted horizontally in the stack frame and extends between a left end 76a and a right end 76b, as viewed in FIG. 6a at which are appropriate bearings for the central horizontal spindle shaft 79. The illustrated spindle provides a large horizontally extending shaft 79 and spaced bearings for supporting the weight of the cutting tool carrier 35 as well as the cutting tool slides 39 thereon and to properly locate the same for the precision machining of the oil holes. The upper end of the tool carrier 35 will also be supported at the top of the column 25.

The upper end of the tool carrier 35 is supported and guided for travel along the top portion of the stack vertical frame plate 45 adjacent the arcuate rack 46, as best seen in FIGS. 5-7, which has internal gear teeth 46a which are meshed with the teeth 48a of a pinion gear 48. This pinion gear is mounted on, fastened to and is driven by a horizontally disposed servo drive motor 47 on the tool carrier 35. As the pinion gear rotates, it causes the tool carrier 35 to swing about the axis 50 in the B-axis direction to change its angular position relative to the horizontal rotational axis 26 for the crankshaft. The arcuate rack 46 is fastened to the vertically stack plate 45 of column 25 at its left and right ends as well as several other locations along this plate. The arcuate rack is substantially coextensive in arcuate length to an upper arcuate, top edge 45a of the plate 45 which has opposite inclined side edges 45a and 45b which define a narrow bottom portion, which is fastened to the horizontal base 68 of column 25. The B-axis arcuate drive motor 47 and its pinion gear 48 are carried by a bracket 81 which is supported on the carrier frame plate 25 on the swingable tool carrier 35.

Figure 3A:
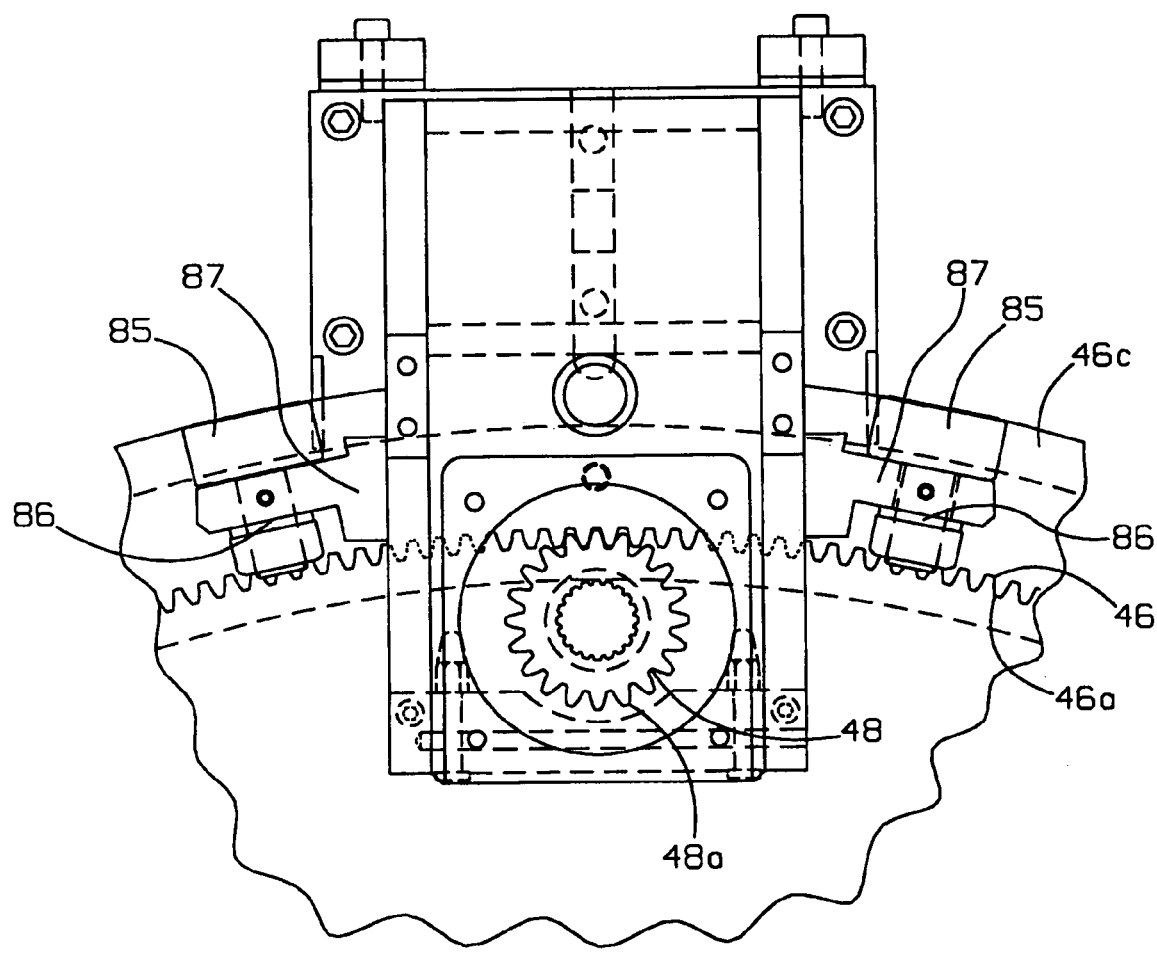
FIG. 3A is an enlarged, fragmentary view of pinion and arcuate rack drive.

The B-axis drive motor 47 exerts a cantilever load which is resisted and borne in part by spaced, eccentrically mounted roller or bearings 85 as best seen in FIGS. 3a and 3b which have rolling engagement with a rear vertical surface 46b on the arcuate guide rack 46. As best seen in FIG. 3A and 5, the rollers 85 have inclined shafts 86 mounted on and extending through holes in the bracket 87 which are fastened to the Z-axis frame member that mounts the motor 47 and the pinion 85.

The cutting tool slide 39, which carries the cutting tool 40 and 40a as best seen in FIG. 7, travels in the Z-axis direction with a slide portion 91 thereon, sliding along guide rails or ways 92 carried on the vertical pivoted plate of the tool carrier 35. The tool carrier 35 has a main slide body 91 carrying spaced guide rails 92 as best seen in FIG. 7 to guide the cutting tool slide 39 to slide and plunge along the Z-axis toward and from the crankshaft. In this instance, there are three pairs of guide blocks 94 which are slidably mounted on the guide rails 92 for sliding movement along the Z-axis in a precise manner to bring the cutting tools 40 and 40a into engagement and from disengagement from the crankshafts.

For the purpose of moving the cutting tool slide along the Z-plunging axis, there is provided a motor drive 95 (FIG. 7) which comprises a Z-drive motor drive 95 and a driven ball screw 96 extending vertically on the tool carrier 35 so that as the ball screw 96 turns in a nut (not shown) in the slide body 91, the guide blocks 94 on the slide body 91 slide along the respective ways 92 to move the tools 40 and 40a along the Z-axis. The Z-axis motor drive 95 includes an upper, horizontally disposed motor 98 with a right angle gear drive 99 to which the upper end of the ball screw 96 is attached for being driven and rotated about a vertical axis 100 therethrough, as shown in FIG. 7. The vertical axis is parallel to the respective guide blocks 94 and the guide ways 92 so that the tool slide is carried in the Z-axis direction which is the plunging axis to drill the holes in the crankshafts. The ball screw nut device is mounted within the guide slide block 102 which carries the guide blocks 94 and causes the entire slide 39 to move along the Z-axis.

To drill the holes, there is provided a cantilevered spindle head 110 (FIG. 7) which has a pair of spindles 112 and 112a extending vertically and to which are fastened the tools 40 and 40a to respectively turn about a hole drilling axis 114 and 114a, respectively. The spindles 112 and 112a are driven by a pair of respective spindle drive motors 116 and 116a mounted on the top of the spindle head.

Figure 6A:
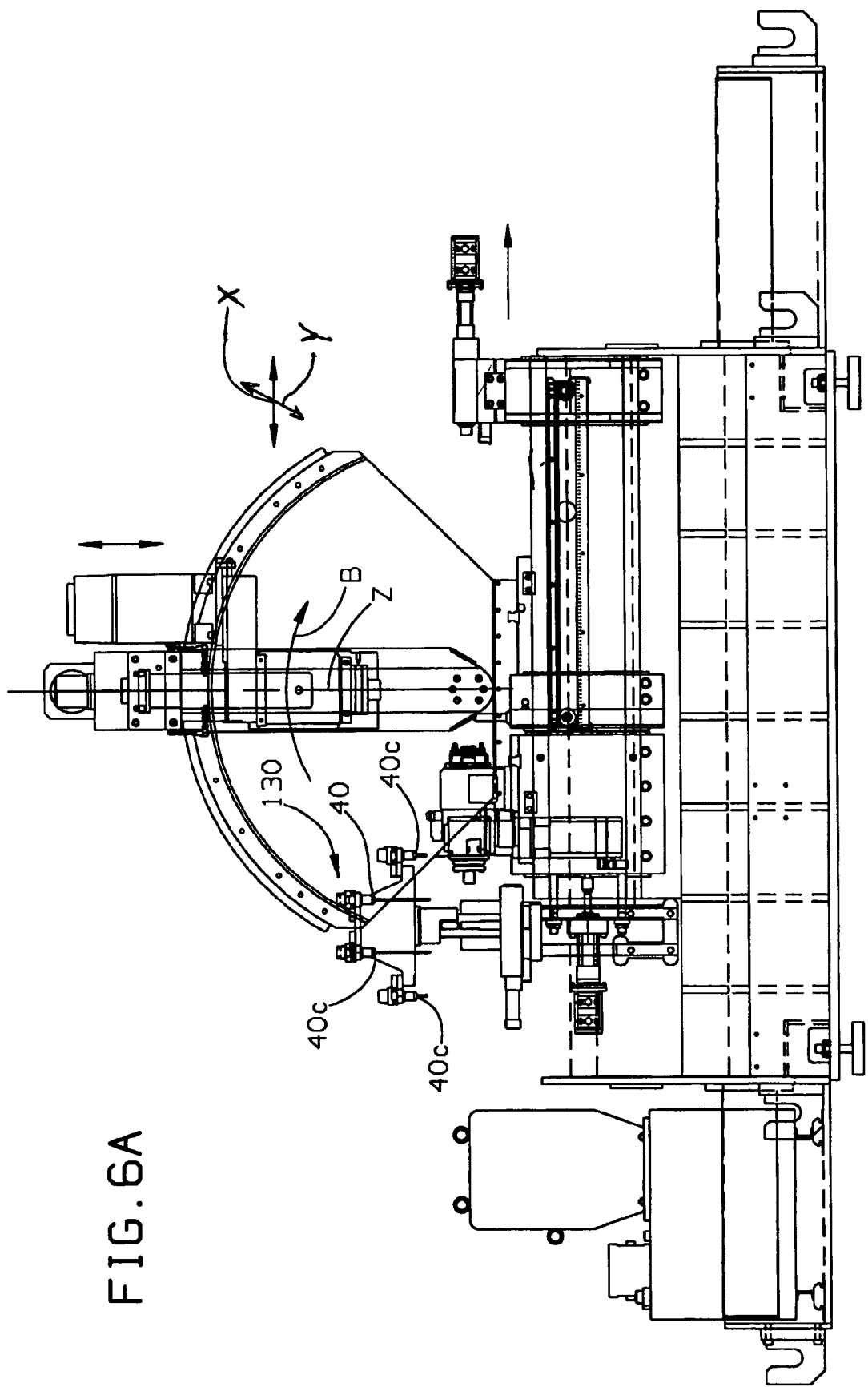
FIG. 6A is a front elevational view of the apparatus.
Figure 6B:
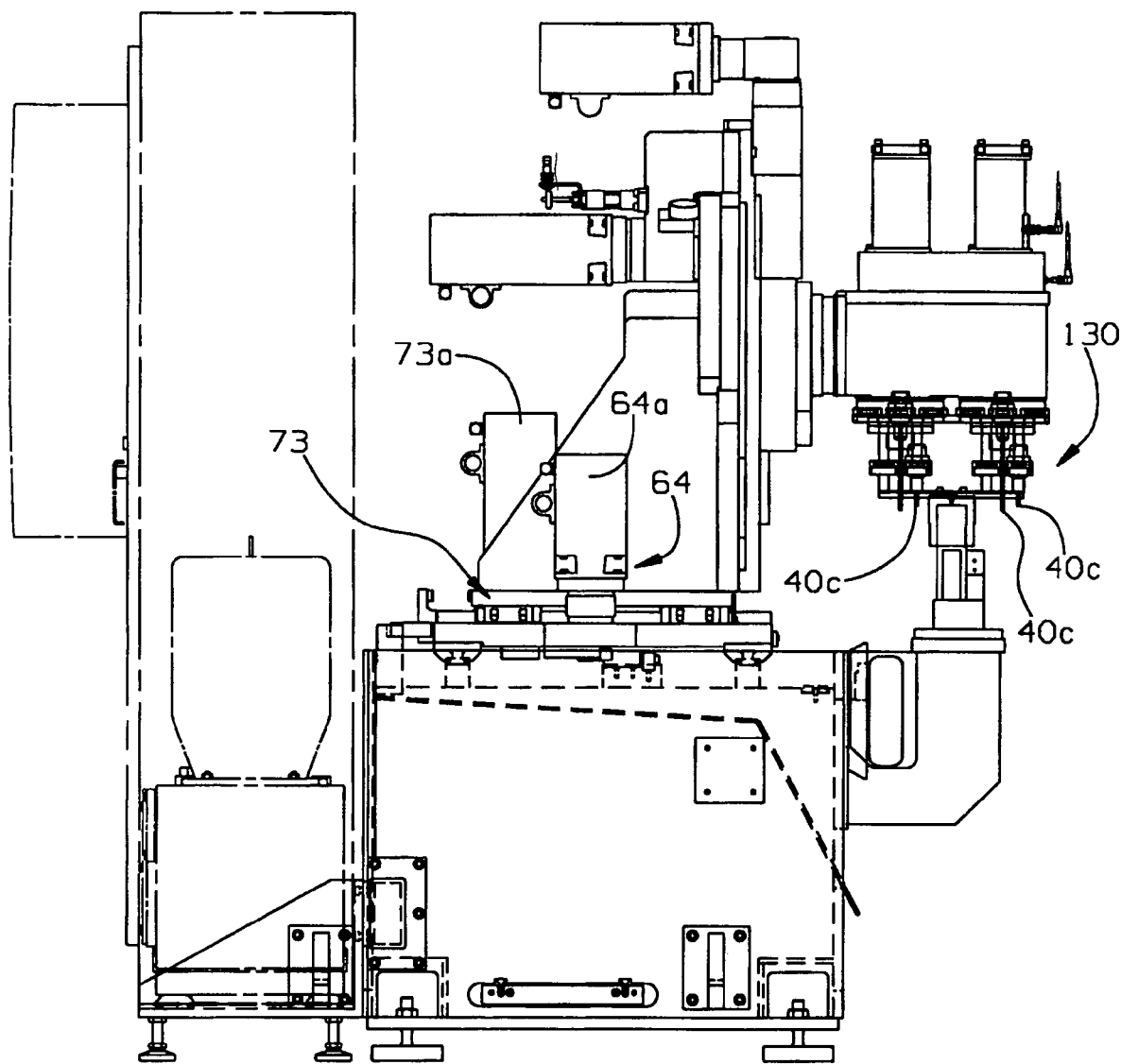
FIG. 6B is a side elevational view of the apparatus.

As best seen in FIGS. 6A and 6B, it is preferred to provide the apparatus with an automatic tool changer 130 having a plurality of tools 40C thereon for automatic placement of tools. In the tool spindles 112 and for automatic removal therefrom. The tools 40C may be various kinds such as hole drill tools, finishing tools, countersink tools or bushings. The automatic tool changer may be of various kinds such as a conventional wine rack tool holder or other conventional tool holders.

A particular advantage of the use of the preferred embodiment by having the pivoting of the slide carrier so as to position the slide carrier at different angles 36 to the rotational angle of the crankshaft is that there is less programming needed and the simplified programming allows the simple shifting of the stack along the longitudinal axis of the crankshaft in the X-direction to move one drilling operation to the next on the crankshaft. For instance, the intersection of a drill hole location with the centerline of the crankshaft is at 120a, as shown in FIG. 10, which is at an X1 displacement or dimension from the left end or reference point of the crankshaft. A second hole location 120 intersects the centerline 26 of the crankshaft at a displacement X2 from the referenced left-hand position. The next drill hole location intersects the axis at 120c at a displacement distance X3 from the left hand reference point, and the fourth or a hole location intersects the axis 26 at the location 120d located at an X4 displacement from the reference point.

Each of the angles 36, 36a, 36b and 36c shown in FIG. 10 may be different or the same for their respective oil hole. Usually the oil hole drilling goes through the outer pin bearing 22b and into the main bearing 22a to intersect the rotational axis at the respective locations 120a, 120b, 120c or 120d. The crankshaft may also be rotated to position the entry and exit positions for the respective holes at the specified rotation or circumferential position on the crankshaft. Thus, in contrast to usual orthogonal X, Y and Z-axis machines in which the tool must be continually repositioned in both the X and Y-directions as the tool drills through the workpiece along a path inclined to the crankshaft axis. The inclination angle of the hole relative to the crankshaft axis is provided along with the X-location such as X1, X2, X3 or X4 as well as the depth of the cut along the Z-axis which determines the amount of travel of the cutting tool into and through the workpiece. Although the dimensional drawings for a crankshaft against which a final inspection is made may in point of fact be located on the drawing relative to the tool entry point and/or the tool exit point only and not dimension the intersection points along the crankshaft axis 26, these intersection points may be easily interpreted or calculated by simple mathematics to provide the X1, X2, X3 and X4 offsets. Thus, with the X1, X2, X3 and X4 offsets, the angles, the circumferential hole entry location on the periphery of the bearing, and the plunging depth along the Z-axis being provided, the drilling spindles may be moved and position the tools for engaging the crankshaft to the drill the holes therein.

Although the preferred and illustrated embodiment has been described as having the pivot axis 50 located at the longitudinal or rotational axis 26 of the workpiece, it is possible to have the pivot axis located intersecting a line or plane 26a (FIG. 11) which is located below the centerline 26 with the plunging axes being located at the respective angles 36e and 36f, respectively. When the pivot axis is at the intersection of the horizontal plane through the centerline 26, there is no horizontal offset to be compensated or accounted for when drilling a hole along either the plunging axis Z1 or Z3. They both intersect the axis 26 at the same point. On the other hand, there is a first horizontal offset between points 50b and 50c on the carrier at axis 26a where the plunging tool travels along axis Z2 and intersects the pivot axis 26a at point 50c and when drilling tools move along the plunging axis Z1 to intersect the lower horizontal pivot axis 26a at the point 50b. Thus, there would have to be an offset added or subtracted to the X-direction displacement of the tool carrier when shifting the tool carrier in the X-direction between drilling first along the axis Z1 and then axis Z2. By having the tool carrier pivot axis at the centerline 26 of the workpiece, there is no need for calculating and compensating for an X-axis offset for each of the different angles of plunging of the tool. Manifestly, the provision of such positive and negative offsets requires more complex programming for the apparatus.

Another advantage of the use of the arcuate pivoting motion of the tools to plunge along an inclined plunging axis is that the amount of error is reduced as the tool travels closer to the workpiece. If the tool carrier 35 is located incorrectly and travels in the X-direction for an additional 0.001 inch because of backlash or the like to a position 100a (FIG. 12) which is 0.001 further to the right than the correct position 100, as the tool travels down the inclined path Z5, the 0.001 inch displacement is reduced to 0.0001 when the tool intersects the longitudinal axis 26 of the crankshaft. Because of this movement down along the plunging axis, the slight variations infeed from one X1 coordinate to another X-coordinate are overcome better than in the existing orthogonal X and Y displacements only apparatus.

While the above embodiment has been described and illustrated as having the stack being vertical and as having the tool carrier being positioned at various angles to the horizontal axis 26, it is to be appreciated that the device could be rotated such that the plunging axis has a substantially horizontal movement then the illustrated vertical movement. The vertical movement is preferred in that it is easier to get the heads and spindles out of the way and to allow a lowering and lifting of the crankshafts into a machine. Manifestly, while the invention has been described as being a generally, upright, vertical machine, it is to be understood that the drive and heads may be positioned in other inclined positions or may be positioned horizontally and still fall within the purview of this invention.

The preferred and illustrated embodiment allows the crankshaft axis to be substantially horizontal and crankshafts to be loaded and unloaded from above along a vertical path of machine entry and exit. The illustrated apparatus has a controller with computers and software and the preferred motors are servo motors with the usual encoders and feedback controls therefore.

Although the preferred and illustrated embodiment is described machining a pair of crankshafts to provide increased production for a single machine, it is to be understood that a single crankshaft or other workpiece could be moved.

The above-described embodiments are merely illustrated of the invention and other embodiments, changes or modifications can be made and still fall within the purview of the appended claims.

What is claimed is:

1. A method of machining an elongated workpiece having a longitudinal axis and radially extending projections, the method comprising:
    rotating the workpiece about its longitudinal axis to position the projections relative to a cutting tool;
    mounting a tool carrier carrying the cutting tool on a lower bearing for being pivoted in an arcuate path to position a plunging axis for the tool at various angles including oblique angles to the axis of the workpiece;
    driving the tool carrier at an upper end thereof remote from the lower bearing for shifting the tool carrier in the arcuate path about the lower bearing; and
    plunging the tool along a straight line path of travel and at a predetermined angle to the workpiece longitudinal axis to engage the projections of the workpiece at the predetermined angle and machining the workpiece,
    wherein the pivoting of the tool carrier about an arcuate path comprises arranging the bearing to be coincident with the rotational, longitudinal axis of the workpiece.

2. A method of drilling oil holes in a crankshaft, the method comprising:
    placing the crankshaft for rotational movement about its longitudinal rotational axis between centers;
    rotating the crankshaft about the longitudinal rotational axis to present a peripheral surface thereon to receive an oil hole drilled therein;
    mounting a tool carrier to a vertical frame member to turn in an arcuate path about a pivot axis coincident with the crankshaft longitudinal rotational axis;
    driving the tool carrier along an arcuate rack adjacent an upper end of the vertical frame member with the arcuate rack having a radius curvature centered at the pivot axis to position a tool and its plunging Z-axis at an oblique angle to the rotational axis; and
    moving a cutting tool slide of the tool carrier and a tool thereon down along the plunging Z-axis from a position on the tool carrier and the vertical frame member remote from the crankshaft to engage the crankshaft to drill an oil hole in the crankshaft at an oblique angle to the longitudinal axis with error due to the driving of the tool carrier along the upper arcuate rack reduced as the tool moves down along the plunging Z-axis.

3. A method of drilling oil holes in a crankshaft in accordance with claim 2 comprising:
    shifting a machine stack carrying the tool carrier along the X-axis to a location for the next offset hole drilling operation; and
    pivoting the tool carrying slide on the machine to an appropriate angle relative to the crankshaft axis about the B-axis to position the tool for travel along the Z-axis to drill the oil hole.

4. A method in accordance with claim 2 including lowering and lifting the drilling tools into and from the drilling position.

5. A method in accordance with claim 2 wherein only the tool carrier turns and the crankshaft is not turned about a turning axis normal to its longitudinal axis.

6. A method of machining holes in a crankshaft, the method comprising:
    positioning a crankshaft for rotation about a longitudinal turning axis;
    moving a tool along a plunging axis to machine a first hole in the crankshaft at a first angle to the longitudinal axis;
    turning the tool to a second angle for machining a second hole in the crankshaft at the second and different angle from the first angle;
    shifting the tool in a direction parallel to the longitudinal axis of the crankshaft to a predetermined point on the longitudinal axis at which the second hole is to intersect the longitudinal axis;
    plunging the tool along a plunging axis which is at the second angle to first engage the crankshaft at an entry point on the crankshaft peripheral surface which is offset from the predetermined point on the crankshaft longitudinal axis; and
    reducing tolerance error due to turning the tool along a curved path by a factor dependent upon the distance that the tool is from the crankshaft as the tool travels along the plunging axis through this distance to the entry point.

7. A method of machining an elongated workpiece having a longitudinal axis and radially extending projections, the method comprising:
    rotating the workpiece about its longitudinal axis to position the projections relative to a cutting tool;
    mounting a tool carrier carrying the cutting tool on a lower bearing for being pivoted in an arcuate path to position a plunging axis for the tool at various angles including oblique angles to the axis of the workpiece;
    driving the tool carrier at an upper end thereof remote from the lower bearing for shifting the tool carrier in the arcuate path about the lower bearing;
    plunging the tool along a straight line path of travel and at a predetermined angle to the workpiece longitudinal axis to engage the projections of the workpiece at the predetermined angle and machining the workpiece;
    mounting the tool carrier to a vertical plate member with an arcuate drive rack adjacent a curved upper end of the vertical plate member and having a radius of curvature that is centered on the workpiece longtidunal axis, mounting a cantilevered motor to the vertical plate member to extend transversely therefrom for driving the tool carrier in the arcuate path along the arcuate drive rack, and supporting the cantilevered motor with bearings at the curved upper end of the vertical plate member to pivot with the tool carrier in the arcuate path.

* * * * *